United States Patent
Panchenko (10) Patent No.: US 12,393,901 B2
(45) Date of Patent: Aug. 19, 2025

(54) INTERFACE SECURITY IN BUSINESS APPLICATIONS

(71) Applicant: Onapsis Inc., Boston, MA (US)

(72) Inventor: Oleksandr Panchenko, Heidelberg (DE)

(73) Assignee: Onapsis Inc., Boston, MA (US)

( * ) Notice: Subject to any disclaimer, the term of this patent is extended or adjusted under 35 U.S.C. 154(b) by 438 days.

(21) Appl. No.: 17/219,363

(22) Filed: Mar. 31, 2021

(65) Prior Publication Data

US 2021/0306370 A1 Sep. 30, 2021

Related U.S. Application Data

(60) Provisional application No. 63/002,778, filed on Mar. 31, 2020.

(51) Int. Cl.
*G06Q 10/0635* (2023.01)
*H04L 9/40* (2022.01)
*H04L 41/22* (2022.01)

(52) U.S. Cl.
CPC ......... *G06Q 10/0635* (2013.01); *H04L 41/22* (2013.01); *H04L 63/1425* (2013.01); *H04L 63/1433* (2013.01)

(58) Field of Classification Search
CPC . H04L 63/1433; H04L 63/1425; H04L 41/22; G06Q 10/0635
See application file for complete search history.

(56) References Cited

U.S. PATENT DOCUMENTS

| | | | |
|---|---|---|---|
| 11,563,764 B1* | 1/2023 | Hoscheit | G06F 21/577 |
| 2012/0017280 A1* | 1/2012 | Wiegenstein | G06F 21/577 |
| | | | 726/25 |
| 2015/0101056 A1* | 4/2015 | Eberlein | G06F 21/577 |
| | | | 726/25 |
| 2015/0319185 A1* | 11/2015 | Kirti | H04L 63/1416 |
| | | | 726/23 |
| 2016/0154962 A1* | 6/2016 | Nuñez Di Croce | G06F 21/577 |
| | | | 726/25 |
| 2017/0180403 A1* | 6/2017 | Mehta | H04L 63/1425 |
| 2017/0288974 A1* | 10/2017 | Yoshihira | H04L 41/12 |
| 2018/0309789 A1* | 10/2018 | Johnson | H04L 41/0893 |
| 2018/0324219 A1* | 11/2018 | Xie | H04L 63/0209 |
| 2022/0131894 A1* | 4/2022 | Hassanzadeh | H04L 63/18 |

* cited by examiner

*Primary Examiner* — Joseph P Hirl
*Assistant Examiner* — Thomas A Gyorfi
(74) *Attorney, Agent, or Firm* — Crowell & Moring LLP (57) ABSTRACT

Security can be improved in a business application landscape, such as an enterprise resource planning ("ERP") system, by analyzing interfaces between systems of the application. The interface profiler may automatically analyze data flows in the system landscape with automatic data classification of communications between systems. A rule generation engine provides functionality for comparing reference data flows with the actual data flows in the landscape and report violations. There may be visualization of the business application landscape, such as through a system landscape map.

8 Claims, 6 Drawing Sheets

INTERFACE SECURITY IN BUSINESS APPLICATIONS

PRIORITY CLAIM

This application claims priority to Provisional patent application No. 63/002,778, filed on Mar. 31, 2020, entitled "INTERFACE SECURITY IN BUSINESS APPLICATIONS", the entire disclosure is herein incorporated by reference.

TECHNICAL FIELD OF THE INVENTION

The present invention relates to security of interfaces into or between systems within business applications, such as an Enterprise Resource Planning (ERP) landscape.

BACKGROUND

Businesses may rely on electronic systems using database technology to manage their key processes. There may be a number of business applications that businesses rely on. One example business application is an Enterprise Resource Planning (ERP) landscape. Other example business applications include Customer Relationship Management (CRM), Supply Chain Management (SCM), Product Lifecycle Management (PLM), Human Capital Management (HCM), and Business Intelligence (BI). These business applications are in charge of processing sensitive business data and, accordingly, the confidentiality, integrity and availability of this information is therefore critical for the security and continuity of the business. Moreover, all security relevant data of a company or an application is provided in the database system. Therefore, reducing the risk of security leaks or compliance breaches in the database system is a major concern.

Business applications are increasingly connected to external computer systems and are accessible by a continuously growing user base. Any merger or acquisition may result in a different landscape and changing interfaces. This means that the exposure of business application computer systems to external vulnerabilities has grown as well. Business applications are more in the focus of hackers, such that the likelihood for attacks increases. Further, not just business application interfaces need to be protected but also interfaces to systems that are not part of the business applications.

An ERP is one example of a business application, which may necessitate interfaces between and into different applications or systems within a larger business application landscape. However, those interfaces could be a risk area for misuse. Interfaces for software applications which could contain vulnerabilities, unintentionally or on purpose, can lead to security or compliance breaches. If this occurs, the business of the organization running the application is endangered through loss of critical/protected data, loss of reputation, loss of business, lawsuits, etc. Therefore, it is industry best practice today to apply dedicated tools for analyzing the software to effectively mitigate these risks, such as the risks with system interfaces.

BRIEF SUMMARY

The present invention relates to a method, system or apparatus and/or computer program product for improved security of interfaces within a business application, such as an enterprise resource planning ("ERP") landscape. In one embodiment, an interface is analyzed by an interface profiler to ensure proper functioning and compliance. The interface profiler may automatically analyze data flows between the systems. There may be automatic data classification of communications between systems. In addition, an application component explorer may be a tool for analyzing classes or arts of data communicated between systems. An automatic rule generation engine provides rules that allow or deny communication paths. There may be visualization of the business application, such as the ERP landscape/system, such as through a system landscape map.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

DETAILED DESCRIPTION OF THE DRAWINGS AND PREFERRED EMBODIMENTS

By way of introduction, the disclosed embodiments relate to systems and methods for maintaining security in a system by inspecting and verifying security of interfaces within the context of a business application, such as an enterprise resource planning ("ERP") landscape/system. SAP® and Oracle® ERP Cloud are two examples of an ERP landscape. Other example business applications include Customer Relationship Management (CRM), Supply Chain Management (SCM), Product Lifecycle Management (PLM), Human Capital Management (HCM), and Business Intelligence (BI). The embodiments described herein relate to the interface into and between applications or systems in one or more business applications. The embodiments apply to business applications and may be described with respect to specific examples, such as an ERP landscape/system.

The interfaces between and into systems in a business application may be security risks. Improper security for the interfaces between applications/systems can result in misuse and data leaks. An entire business application may include a wide number of applications and/or systems, many of which must interface with one another. Centralized analysis of those interfaces can limit the security risks that those interfaces may propose. As described, the risk in the interface between and into systems may be referred to as an interconnected risk between those systems. As described, that interconnected risk in the interface(s) can be analyzed through the embodiments described below.

Figure 1:
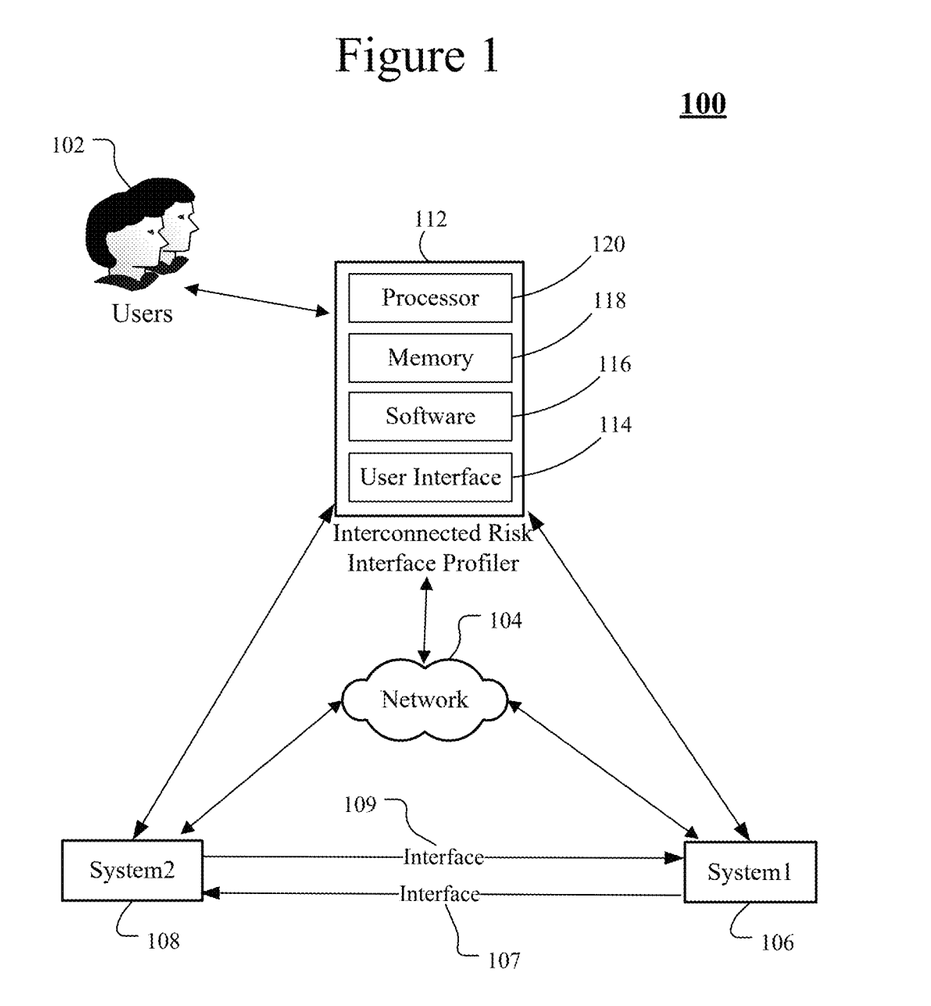
FIG. 1 illustrates a block diagram of an example network system.

FIG. 1 illustrates a block diagram of an example network system 100. The system 100 may be a business application, such as an ERP landscape. The system 100 may include functionality for monitoring any number of interfaces. FIG. 1 illustrates two examples of interfaces 107, 109 of exemplary systems, System1 106 and System2 108, respectively. Although shown as separate interfaces for each system, there may be single interface between two systems in one embodiment. The interface is how systems communicate with one another and an Interface Profiler can analyze the data flows in those communications. There may be more or fewer systems and interfaces. The exemplary systems may be any business application or system, such as an ERP landscape/system, that has an interface. The interfaces may be facing one or more users 102, such as through a network 104, even though that connection is not shown. Although FIG. 1 illustrates the network 104, the interconnections between the systems may communicate through a set of interfaces in one embodiment. In another embodiment, the network 104 may interconnect any of the components including providing access to the interfaces 107, 109. The network 104 may be an internal network, an external network, or a combination. There may be different types of users of the Interconnected Risk Interface Profiler 112 (referred to as interface profiler) that have different access and control. In one example, a basis administrator may be responsible for technical setup. Interface Profiler administrators may be responsible for a business setup. Interface Profiler 112 users 102 may be responsible for the usage and reporting.

The interface profiler 112 may be a computing device operated by one or more users 102 for monitoring interfaces, such as the interfaces 107, 109 between systems. In one embodiment, the interface profiler 112 may be software that runs on a computing device as shown in FIG. 1. The interface profiler 112 monitors interfaces to and/or between exemplary systems, such as system1 106 and system2 108. The exemplary systems may be within a business application. The interface profiler 112 may include a processor 120, a memory 118, software 116 and a user interface 114. In alternative embodiments, the interface profiler 112 may be multiple devices to provide different functions and it may or may not include all of the user interface 114, the software 116, the memory 118, and/or the processor 120. The user interface 114 is described differently from the interfaces 107, 109, but may be a similar interface. In one embodiment, the interface 114 provides access and control of the Interface Profiler 112 for monitoring all other interfaces. In other embodiments, there may be different interfaces for different systems. The user interface 114 may be a user input device or a display. The user interface 114 may include a keyboard, keypad or a cursor control device, such as a mouse, or a joystick, touch screen display, remote control or any other device operative to allow a user or administrator to interact with the interface profiler 112. The user interface 114 may communicate with any of the systems in the network 104, including the interface profiler 112, the system1 106, and/or the system2 108. The user interface 114 may include a user interface configured to allow a user and/or an administrator to interact with any of the components of the interface profiler 112 for checking and managing a transport. The user interface 114 may include a display coupled with the processor 120 and configured to display an output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the interface profiler 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include a verification and checking of the interfaces 107, 109 to ensure the security of both system2 108 and system1 106. This security verification and checking may be implemented from software, such as the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. For example, the interface profiler 112 may be coupled with the system1 106 and/or the system2 108 through the network 104. In some business applications, the network 104 may be a local area network ("LAN"), or may be a public network such as the Internet. Likewise, the interfaces between and with systems may be through different types of network interfaces. Any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The system1 106 and the system2 108 are exemplary systems in a business application. There may be many interfaces that are monitored by the Interfaces Profiler 112. Specifically, the system1 106 and/or the system2 108 may be systems or sub-systems within an ERP landscape. In one embodiments, the system1 106 and/or the system2 108 may be databases within an ERP system and the interfaces 107, 109 provide access to those databases. In other embodiments, one or more of the systems may be remote and the interfaces providing access may be through a public or wide area network.

The interface profiler 112 acts as a security point to detect unauthorized or improper use of systems in business application through an interface. The system2 108 and/or the system1 106 may be external from one another, may be directly connected, or may be part of the same network, such as the network 104. The systems may be an external third-party provider, so the interface profiler 112 inspects and verifies the interface to the third party provider.

The Interface Profiler 112 provides an inventory of each interface, monitors which type of data is transmitted through these interfaces, and automatically categorizes data transported between systems. The Interface Profiler 112 acts as a central hub for analyzing all systems in a business application, such as an ERP landscape that includes SAP® and non-SAP systems. The systems can be grouped and organized for improved data collection and processing.

Data Collection and Classification

Data may be collected for specific systems or all systems in a landscape. The data collected can be adjusted by various settings (e.g. time period) and based on communication type. Data collection may executed through a cockpit shown and described with respect to FIG. 5 below. Exemplary communication types when the business application is an ERP using a SAP® system include, but is not limited to:

SAP OS File Transfer
SAP GUI File Transfer
Database Connection
RFC Data Transfer
HTTP Data Transfer
SMTP Data Transfer The Interface Profiler 112 may have features for data handling, including discarding user names and resolving ICF nodes, archiving data and IDoc communication. The data collection can be set up to run as a recurring job. In addition to communication data, the data collection may include metadata about the systems and interfaces. Collected data can then be analyzed. Analysis may be based on a wide variety of selection criteria, from specific identification, to software application or component, to time period for analysis, to the duration of the connection to IP Address.

The Interface Profiler 112 provides an inventory of each interface, monitors which type of data is transmitted through these interfaces, and automatically categorizes/classifies data transported between systems. The Interface Profiler 112 provides an analysis of data flows in the system landscape that includes an identification of what kind of data is exchanged between which systems. In one embodiment, the data collection and/or classification is automated. Specifically, the Interface Profiler 112 can automatically classify the data based on the metadata of development objects that are involved in the data processing.

Figure 2:
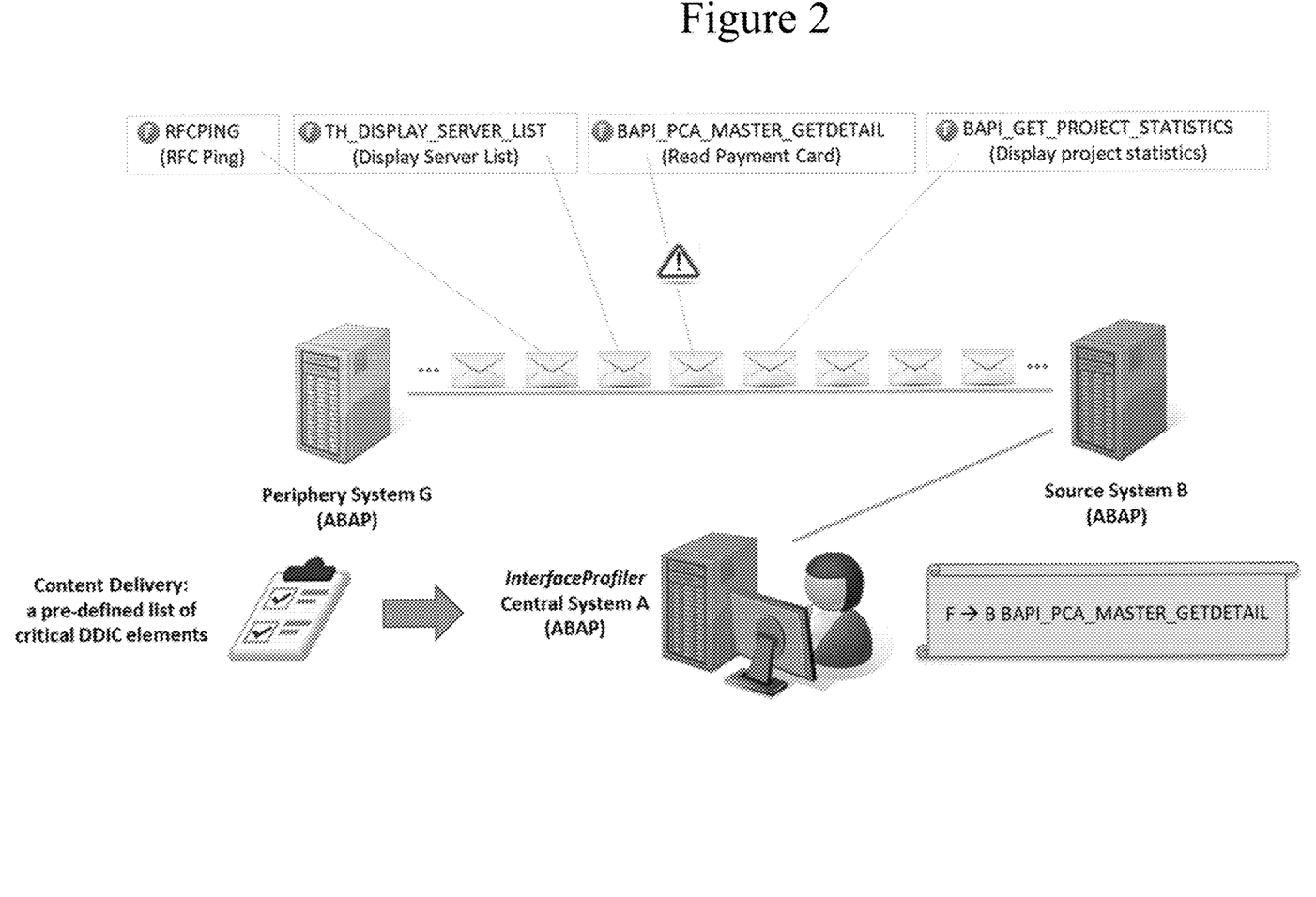
FIG. 2 illustrates another landscape embodiment.

FIG. 2 illustrates another landscape embodiment. In the embodiment, a central system is a logical system designation for a system that collects communication event data from connected systems throughout the landscape. For example, the Interface Profiler 112 may be a central system. A connected system is any system that is connected to the central system. System1 106 and System2 108 are examples of connected systems. The connected system may be a source system that is connected to the central system without the installation of additional central system components. Alternatively, the connected system may be a satellite system that is connected to the central system with the installation of central system satellite components. There may also be a periphery system that is not connected directly to the central system, but interacts with one or more connected systems, resulting in data for these systems showing up in the collected communication data. Periphery systems can be of any type, including ABAP, HTTP, SMTP, SAP GUI terminals. These labels may be designated to all the systems in the landscape as part of the installation of the central system or Interface Profiler.

Periphery system G can exchange data with source system B. Exemplary data is shown at the top and includes RFC Ping, Display Server List, Read Payment Card, and Display project statistics. The Interface Profiler can monitor the interface of the system. In one example, if a remote-enabled function module, such as a get detail request of BAPI_P-CA_MASTER_GETDETAIL, is invoked the analysis would identify that detailed information about a credit card was disclosed to a remote communication partner. The classification can be done based on the name of the development object, but also on the static analysis of its metadata/properties or its signature. Interface Profiler is able to resolve the signature of the function module and check if it contains one of the data elements that may be critical from the security perspective, such as personal data, security-relevant data, and/or critical business data. This can be done automatically using a pre-defined list of critical DDIC (data dictionary) elements (development objects, data elements, etc.). Users or customers can use this list as provided or the list can be expanded with additional elements to be monitored.

In one embodiment, there may be a code analysis. For example, code for the interfaces or systems may be analyzed by the interface profiler 112. U.S. Pat. Pub. No. 2019/0180035 and U.S. Pat. Nos. 8,402,547 and 10,025,688 describe embodiments of a Code Profiler that analyzes code for security vulnerabilities, each of which is hereby incorporated by reference. For example, Code Profiler for ABAP can be used to find development objects that access specific data. This may be done to find development objects that proceed and disclose critical data but this data is not properly declared in the metadata of the development object or its signature. For example, an exporting parameter of the function module can be declared as STRING, so neither its name nor its type would indicate that the output of the function contains critical information. However, an analysis is able to cover this scenario because of the code analysis capabilities. The analysis from Code Profiler can also be imported into the Interface Profiler 112.

In one embodiment, there may be an application component explorer that is an analysis tool for an overview over classes of transmitted data. This tool may be used for the automatic classification of data. The Interface Profiler 112 provides monitoring tools for data that is transmitted between systems and is able to capture communication events and detect which class of data was used in which communication events. After the data has been collected it can be analyzed, such as with a Collected Event Viewer. The Collected Event Viewer may be a feature of the Interface Profiler 112 and may include a selection screen for specifying which event information and data to collect. There may be a filter to find communication events (e.g. file access, RFC function call, HTTP call, etc.) that exchange data of a certain class (e.g., financial data, sensitive personal data, critical security-relevant data, etc.). This filter is a classification of the data can be performed automatically upon setting up the filter. The input of this filter may be a list of data classes (i.e. application components) and the output of the filtering process may be a list of communication events that match the selection. Scaling this feature may be difficult based on a number of application components to be searched for. Specifically, analysis of a large amount of application components may be difficult.

Accordingly, the underlying data model may have a hierarchical nature. For example, one application component (e.g., "MM"—"material management applications" or "VF-GDPR"—"VirtualForge application components related to GDPR topics") can include further application components (e.g., "MM-IM"—"inventory management" or "VF-GDPR-ADDR"—"personal address data"). This may be based on ERP practice to group technical functionalities into business areas. Each application component may be used in several development objects (function module, program, web service, etc.). The same development object may be deployed at different ERP systems (e.g. communication partners). Each communication partner may be involved into several communication paths and each communication path may have multiple communication events. This can be written mathematically as: <application component>[N:M] <development object>[N:M]<communication path>[1:N] <communication event>. Accordingly, on the way from an application component to a single communication event multiple options can be used to aggregate the data. The user may have the possibility to decide what data should be aggregated in which way as a tool added to the toolset of the Interface Profiler.

The Application Component Explorer can show an aggregated view over a flat list of communication events. A Tree Table control may give a user the possibility to decide what data needs to be shown (filtering functionality) and how to aggregate the communication events. Exemplary questions that can be answered using the Application Component Explorer include: 1) what classes of data are transmitted in my system landscape?; 2) what classes of data are transmitted how often?(in terms of execution frequency or in terms of data volume); 3) for a certain class of data or a category of data classes—what are the development objects that process this data?; 5) on which systems are these development objects deployed?; and 6) what communication partners exchange data of certain class? The starting point of the analysis may be the class of data (i.e. application component(s)). However, unlike the Collected Events Viewer, the Application Component Explorer may not just show the list of the collected events (that potentially can be very long), but also provides an aggregated overview over the development objects and communication paths.

The Application Component Explorer uses data classification (i.e. application components) to filter communication events. The Application Component Explorer provides a way of representing and analyzing existing data. This may allow users to search more specifically, rather than searching for entire groups of application components.

Figure 5:
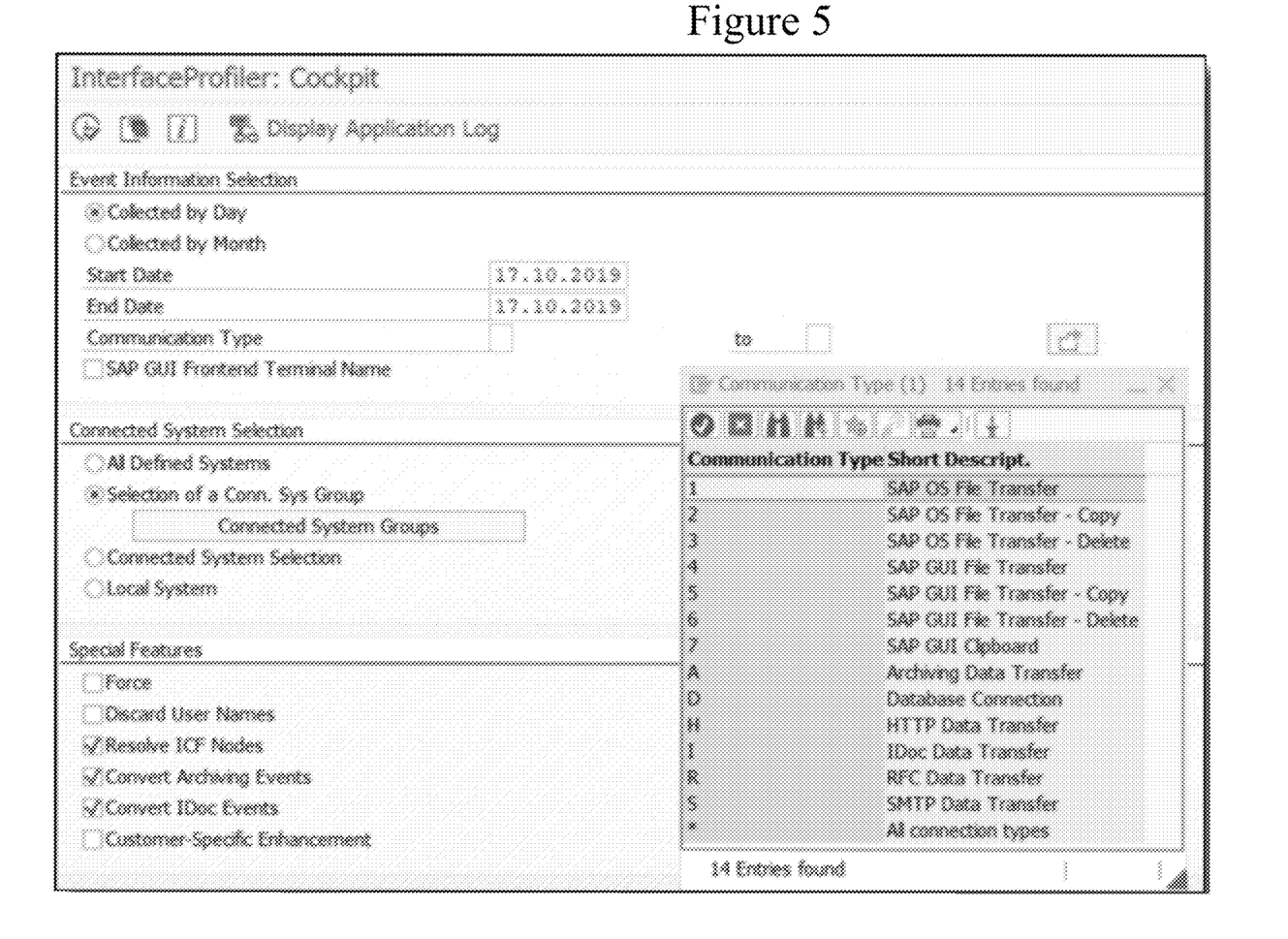
FIG. 5 illustrates a cockpit for data collection.

The data collection may through a cockpit, such as that shown in FIG. 5. The Cockpit enables collecting data for specific systems or all systems. The Cockpit may have special features for data handling, including discarding user names and resolving ICF nodes. The Dispatcher executes data collection specified in the Cockpit, thereby enabling a user to set it up to run as a recurring job. The Cockpit may be used to request event information from one or more Connected Systems based on collection level, period, and Communication Type. The Cockpit may be executed manually or by a scheduled job. The Cockpit automatically executes a Dispatcher to start data retrieval of requested event information from the Connected Systems that you select. In the Event Information Selection area, the collection level can be selected (Collected by Day or Collected by Month), the period (Start Date and End Date), all, one, or multiple Communication Types, and collection of SAP GUI terminal names (SAP GUI Frontend Terminal Name). The Dispatcher collects event information from Connected Systems based on selections made in the Cockpit, depending on existing entries in the a database table. The Dispatcher may be executed automatically from the Cockpit, or it can be executed manually, or by a scheduled job.

Figure 6:
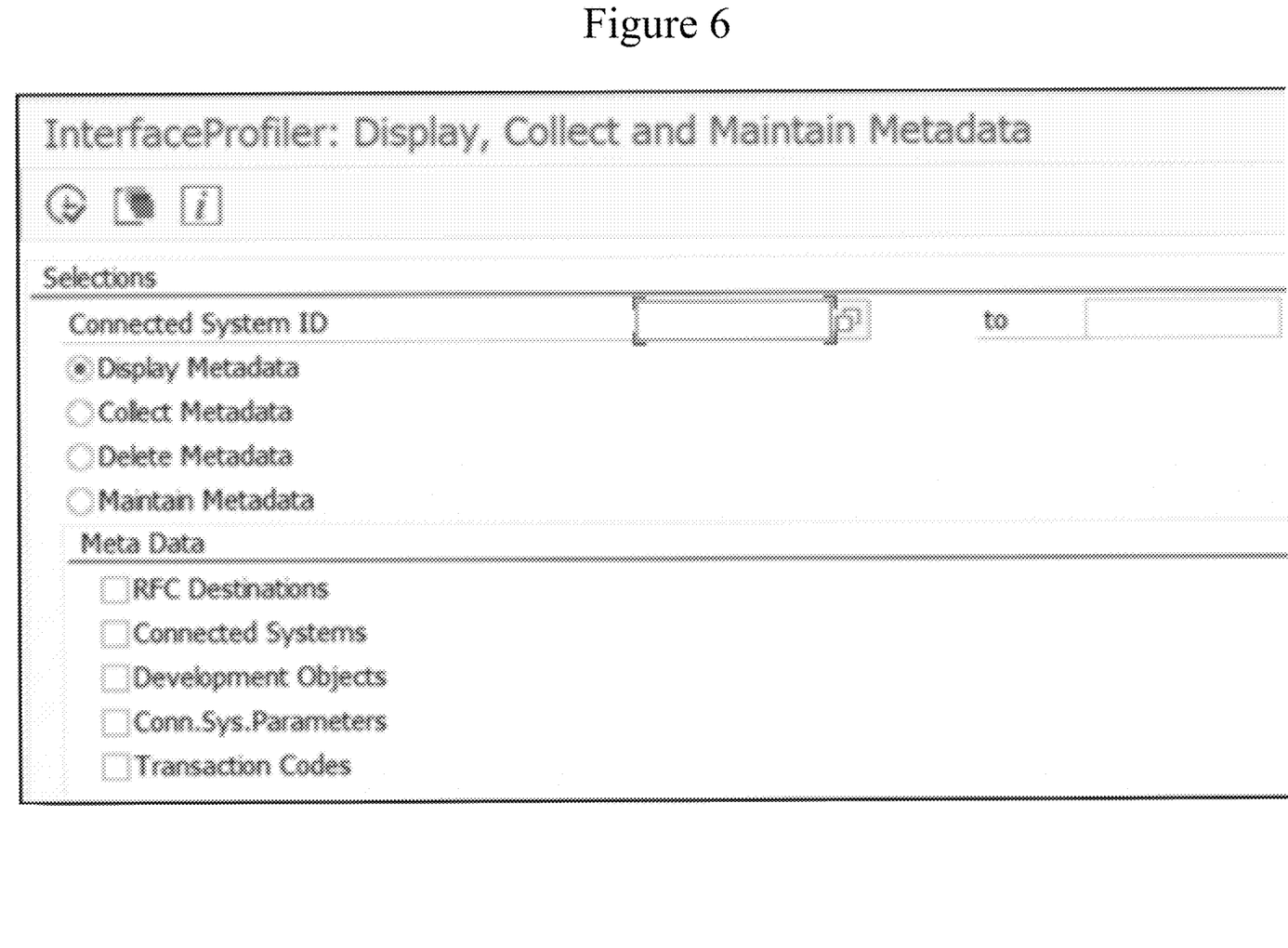
FIG. 6 illustrates metadata collection and analysis.

FIG. 6 illustrates metadata collection and analysis. Data can be collected about communication events between systems throughout a landscape, In addition, a wide variety of metadata about the systems and interfaces can also be collected, including RFC Destinations, Connections to other Connected Systems, Development Objects such as RFC-enabled function modules and interface parameters, Connected System Parameters (InterfaceProfiler File Interfaces, Workload Monitoring, Security Audit Log, and/or SAP Gateway), and/or Transaction Codes.

Resolution of Metadata

The Interface Profiler is able to capture communication between systems (e.g. RFC calls, HTTP calls, file exchange, etc.). The automatic data classification provides insights into the data that is exchanged between communication partners. This may be accomplished based on the development object (e.g. function module, program, web service, etc.) that is involved into the communication event. The development object and its signature is analyzed and application components are assigned. This allows search for communication events that transports data of certain class (e.g., financial data, sensitive personal data, critical security-relevant data). In one example, the intermediate document format (IDoc) is a format to exchange business data between systems. Such communication is captured by the Interface Profiler, but the data classification may be difficult because the development objects that process IDocs may be the same for all IDoc types. Therefore, it may not be possible to use the name of the development objects to distinguish between different IDoc types. This may be the same with the archiving objects. ERPs (e.g. SAP®) may allow archiving of only certain business documents. Depending on the way the archive documents are created (e.g. file, RFC) the records are collected as communication events. The Interface Profiler may not recognize that an archive object was created, and cannot detect what business object was archived and therefore what class of data was transported. Accordingly, the Interface Profiler may use additional data sources (e.g. IDoc logs and Archive logs) to gain additional information and to join this information with existing communication events. Afterwards, the standard development object may be replaced by the corresponding IDoc type or archive object. This allows analysis of IDocs and archives as any other development object. Search function starting with an application component is also possible. For example, a user can assign an application component VF-GDPR-ADDR (personal address data) to an IDoc business partner. Likewise, a search for the application component VF-GDPR-ADDR may return all import/export operations of the IDoc business partner. The joining of these two existing data sources may provide better analysis.

Collecting metadata and analyzing metadata may be part of the Dispatcher collecting event information from requested Connected Systems. The event information may also include information about the used transaction (TCODE field) and the executed object (the OBJECT and OBJ_NAME fields) stored in a database table. In the Central System, a transaction can be used to get additional information, which is known as metadata.

System Landscape Map

Figure 3:
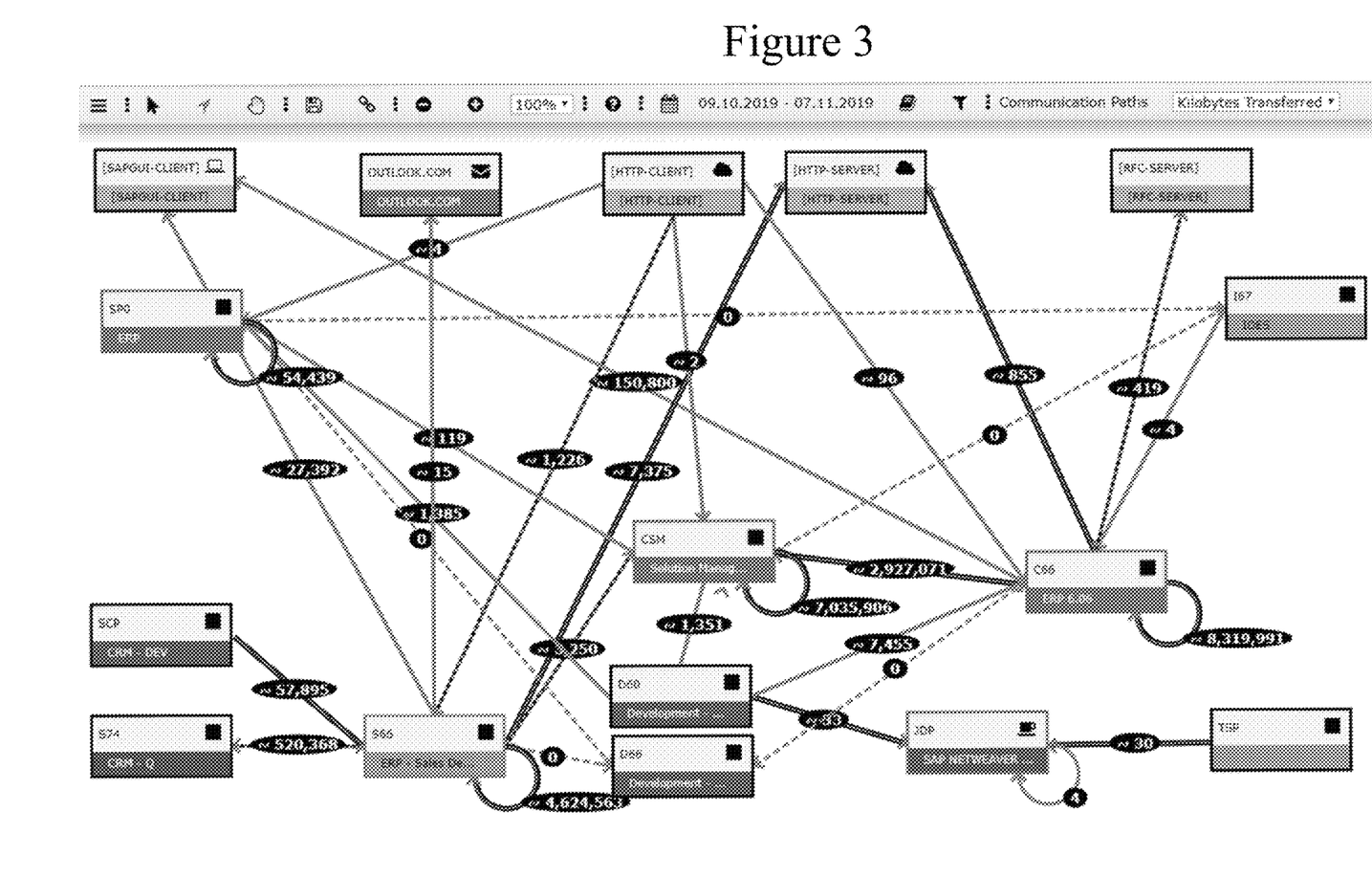
FIG. 3 illustrates an exemplary system landscape map visualization.
Figure 4:
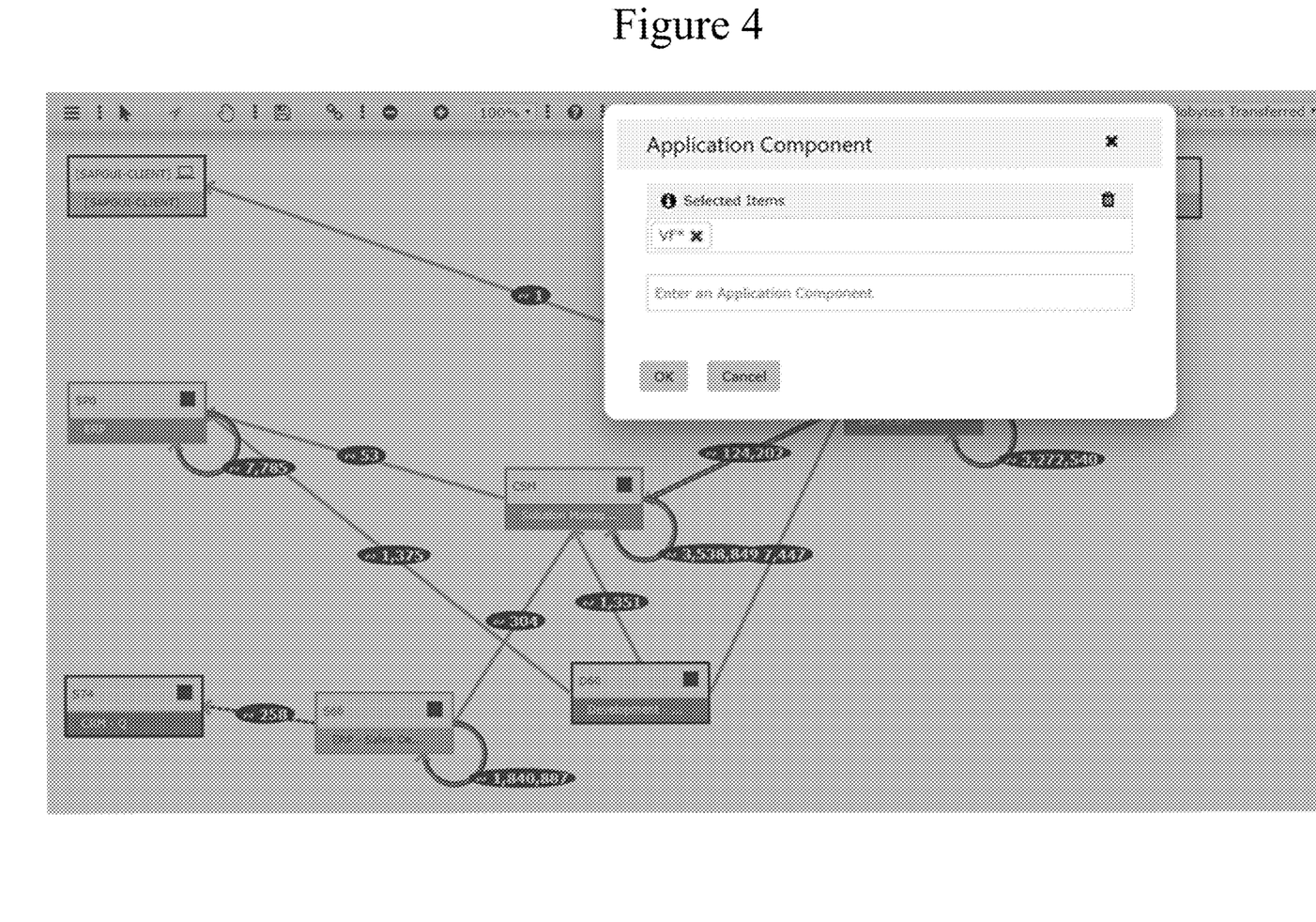
FIG. 4 illustrates a system landscape map with a filter option.

FIG. 3 illustrates an exemplary system landscape map. As part of the data collection and then analysis, the Interface Profiler 112 can generate a system landscape map to display systems and interfaces visually. The map may also display any vulnerabilities that are identified based on the data analysis. The system landscape map can display any number of the systems and interfaces, as well as vulnerabilities. Specifically, the communication partners and communication paths are visualized. The visualization may be customizable through numerous visualization features, including changing the layout, color-coding of certain metrics, and/or filters. In addition, the visualization has a decorator function that provides different decorators to add more information to the chart. Specifically, the number of communication events, amount of data transmitted can be visualized in the chart. In addition, communication paths can be filtered based on the class of data transported (e.g. application components). FIG. 4 illustrates a system landscape map with a filter option. This filtering reduces a potentially large visualization to more relevant parts of the system landscape.

Rule Generation

The Interface Profiler 112 may include an option for creating a model or ruleset to generate the target system landscape and compare it using collected data. Rules may define a blueprint of communication among the interfaces of the landscape, including both allowed (whitelisted) and forbidden (blacklisted) communications. The rules may identify violations and the identification may be marked on the system map. In one embodiment, communication violations may be marked in a different color on the system map. Violations of the blueprint can trigger alerts. The Interface Profiler 112 may enable groups of rules to be generated and implemented.

The Interface Profiler is able to create a blueprint of the communication in a system landscape and check if the actual communication is conformed to this blueprint. The blueprint may be a list of rules that allow or deny certain communication paths. It is done similar to the firewall rules, but the communication event that violates the rules are not blocked, such events are just reported.

To make the process of the blueprint creation easier InterfaceProfiler is able to generate rules automatically. The automatic rule generation is based on an analysis of existing events and may suggest which events are allowed. After the rules have been automatically created and applied, new communication partners may violate these rules. Accordingly, changes in the system landscape can be detected in an automatic way.

Report Generation

The Interface Profiler 112 may output a structured graphical report while generating data-rich logs of all vulnerabilities detected. InterfaceProfiler produces a visual representation of a system landscape. For example, the landscape of an ERP system may be visualized by the Interface Profiler 112. The visualization may include communication events that may be automatically classified depending on the type of data.

Events can be marked or tagged with labels depending on the classification. The metadata of marks or tags allows searching to be quick over large amounts of data to focus on certain types of data-flows.

The meaning of specific details should be construed as examples within the embodiments and are not exhaustive or limiting the invention to the precise forms disclosed within the examples. One skilled in the relevant art will recognize that the invention can also be practiced without one or more of the specific details or with other methods, implementations, modules, entities, datasets, etc. In other instances, well-known structures, computer-related functions or operations are not shown or described in detail, as they will be understood by those skilled in the art.

The discussion above is intended to provide a brief, general description of a suitable computing environment (which might be of different kind like a client-server architecture or an Internet/browser network) in which the invention may be implemented. The invention will be described in general context of computer-executable instructions, such as software modules, which might be executed in combination with hardware modules, being executed by different computers in the network environment. Generally, program modules or software modules include routines, programs, objects, classes, instances, components, data structures, etc., that perform particular tasks or implement particular abstract data types. Computer-executable instructions, associated data structures and program modules represent examples of the program code means for executing steps of the method described herein. The particular sequence of such executable instructions, method steps or associated data structures only represent examples of corresponding activities for implementing the functions described therein. It is also possible to execute the method iteratively.

Those skilled in the art will appreciate that the invention may be practiced in a network computing environment with many types of computer system configurations, including personal computers (PC), hand-held devices (for example, smartphones), multi-processor systems, microprocessor-based programmable consumer electronics, network PCs, minicomputers, mainframe computers, laptops and the like. Further, the invention may be practiced in distributed computing environments where computer-related tasks are performed by local or remote processing devices that are linked (either by hardwired links, wireless links or by a combination of hardwired or wireless links) through a communications network. In a distributed computing environment, program modules may be located in local or remote devices, memory systems, retrievals or data storages.

Generally, the method according to the invention may be executed on one single computer or on several computers that are linked over a network. The computers may be general purpose computing devices in the form a conventional computer, including a processing unit, a system memory, and a system bus that couples various system components including system memory to the processing unit. The system bus may be any one of several types of bus structures including a memory bus or a memory controller, a peripheral bus and a local bus using any of a variety of bus architectures, possibly such which will be used in clinical/medical system environments. The system memory includes read-only memory (ROM) and random access memories (RAM). A basic input/output system (BIOS), containing the basic routines that have the functionality to transfer information between elements within the computer, such as during start-up, may be stored in one memory. Additionally, the computer may also include hard disc drives and other interfaces for user interaction. The drives and their associated computer-readable media provide non-volatile or volatile storage of computer executable instructions, data structures, program modules and related data items. A user interface may be a keyboard, a pointing device or other input devices (not shown in the figures), such as a microphone, a joystick, a mouse. Additionally, interfaces to other systems might be used. These and other input devices are often connected to the processing unit through a serial port interface coupled to system bus. Other interfaces include a universal serial bus (USB). Moreover, a monitor or another display device is also connected to the computers of the system via an interface, such as video adapter. In addition to the monitor, the computers typically include other peripheral output or input devices (not shown), such as speakers and printers or interfaces for data exchange. Local and remote computer are coupled to each other by logical and physical connections, which may include a server, a router, a network interface, a peer device or other common network nodes. The connections might be local area network connections (LAN) and wide area network connections (WAN) which could be used within intranet or internet. Additionally, a networking environment typically includes a modem, a wireless link or any other means for establishing communications over the network. Moreover, the network typically comprises means for data retrieval, particularly for accessing data storage means like repositories, etc. Network data exchange may be coupled by means of the use of proxies and other servers.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

The invention claimed is:

1. In a business application, a computer system for monitoring interfaces for an interconnected risk, comprising:
   a first system;
   a second system;
   an interface between the first system and the second system; and
   an interconnected risk interface profiler configured to:
      collect data related to communications through the interface between the first system and the second system;
      analyze the collected data and code for the interface, wherein to analyze the collected data, the interconnected risk interface is configured to:
         automatically identify a type of data of one or more portions of the collected data; and
         at least one of automatically categorize or classify the one or more portions of the collected data based at least in part on the identified type of data of the one or more portions of collected data; and
      display a system landscape map visualizing communication paths between the first system and the second system, and visualizing vulnerabilities identified based on the analysis of the collected data and the code for the interface.

2. The computer system of claim 1, wherein the business application comprises a software application.

3. The computer system of claim 2, wherein the software application comprises at least one of Customer Relationship Management (CRM), Supplier Relationship Management (SRM), Supply Chain Management (SCM), Product Lifecycle Management (PLM), Human Capital Management (HCM), Integration Platforms, Business Warehouse (BW), Business Intelligence (BI), or enterprise resource planning (ERP).

4. The computer system of claim 2, wherein the software application comprises at least one of SAP software, Oracle software, Microsoft software, Siebel software, JD Edwards software, Salesforce, Workday, Netsuite, or PeopleSoft software.

5. The computer system of claim 1, wherein the vulnerabilities identified comprise interconnected risks over the interface with the communication paths that are visualized.

6. The computer system of claim 1, wherein the communications through the interface are over a network.

7. The computer system of claim 1, wherein the collected data and code for the interface is analyzed automatically.

8. A method for monitoring interfaces for an interconnected risk, comprising:
   collecting, with an interconnected risk interface profiler, data related to communications through an interface between a first system and a second system;
   analyzing, with the interconnected risk interface profiler, the collected data and code for the interface, wherein analyzing the collected data comprises:
      automatically identifying a type of data of one or more portions of the collected data; and
      at least one of automatically categorizing or classifying the one or more portions of the collected data based at least in part on the identified type of data of the one or more portions of collected data; and displaying, with the interconnected risk interface profiler, a system landscape map visualizing communication paths between the first system and the second system, and visualizing vulnerabilities identified based on the analysis of the collected data and the code for the interface.

* * * * *